United States Patent
Emoto

(10) Patent No.: US 11,764,700 B2
(45) Date of Patent: Sep. 19, 2023

(54) POWER SUPPLY CIRCUIT AND INPUT/OUTPUT MODULE

(71) Applicant: MITSUBISHI HEAVY INDUSTRIES, LTD., Tokyo (JP)

(72) Inventor: Hideaki Emoto, Yokohama (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 17/780,197

(22) PCT Filed: Oct. 26, 2020

(86) PCT No.: PCT/JP2020/040150
§ 371 (c)(1),
(2) Date: May 26, 2022

(87) PCT Pub. No.: WO2021/111764
PCT Pub. Date: Jun. 10, 2021

(65) Prior Publication Data
US 2022/0416682 A1    Dec. 29, 2022

(30) Foreign Application Priority Data

Dec. 5, 2019 (JP) .................... 2019-220191

(51) Int. Cl.
*H02M 7/10* (2006.01)
*H02M 1/00* (2006.01)

(52) U.S. Cl.
CPC ............ *H02M 7/103* (2013.01); *H02M 1/008* (2021.05)

(58) Field of Classification Search
CPC .............................. H02M 7/103; H02M 1/008
See application file for complete search history.

(56) References Cited

U.S. PATENT DOCUMENTS

2010/0301985 A1* 12/2010 Luo .................. H02M 7/103
336/221
2018/0069484 A1    3/2018 Kurokawa

FOREIGN PATENT DOCUMENTS

| JP | H09-037551 A | 2/1997 |
| JP | 2000-058290 A | 2/2000 |
| JP | 2003-200573 A | 7/2003 |
| WO | 2016/189980 A1 | 12/2016 |

OTHER PUBLICATIONS

International Search Report dated Dec. 15, 2020, issued in counterpart Application No. PCT/JP2020/040150, with English Translation. (5 pages).
Written Opinion dated Dec. 15, 2020, issued in counterpart Application No. PCT/JP2020/040150, with English Translation. (10 pages).

(Continued)

*Primary Examiner* — Jue Zhang
(74) *Attorney, Agent, or Firm* — WHDA, LLP

(57) ABSTRACT

A power supply circuit is provided with: an AC voltage supply part; and one or more Cockcroft-Walton circuits. The one or more Cockcroft-Walton circuits include a plurality of output terminals and are supplied with an AC voltage from the AC voltage supply part. The plurality of output terminals are configured to output different DC potentials for each output terminal according to a magnitude of the AC voltage.

4 Claims, 4 Drawing Sheets

(56) References Cited

OTHER PUBLICATIONS

Notification Concerning Transmittal of International Preliminary Report on Patentability (Forms PCT/IB/326) Bsued in counterpart International Application No. PCT/JP2020/040150 dated Jun. 16, 2022, with Forms PCT/IB/373, PCT/IB/338 and PCT/ISA/237. (12 pages).

* cited by examiner

POWER SUPPLY CIRCUIT AND INPUT/OUTPUT MODULE

TECHNICAL FIELD

The present disclosure relates to a power supply circuit and an input/output module.

BACKGROUND

As a power supply circuit, a circuit that generates a predetermined DC voltage from an AC voltage has been widely used. For example, Patent Document 1 discloses a circuit using a Cockcroft-Walton circuit. This Cockcroft-Walton circuit has one input terminal and one output terminal.

CITATION LIST

Patent Literature

Patent Document 1: JP2003-200573A

SUMMARY

Problems to be Solved

In a small modularized electronic circuit (e.g., I/O module), multiple DC voltages of different magnitudes may be required as power supply voltages for electronic devices or circuit blocks. However, the Cockcroft-Walton circuit of Patent Document 1 is a circuit for obtaining one output voltage (DC voltage having a magnitude of an integral multiple of input voltage) from one input voltage. Therefore, it is not configured to supply multiple DC voltages.

As a configuration for realizing multi-DC voltage, there is known a configuration in which multiple DC voltages are generated by a plurality of transformers and rectifier circuits, and a configuration in which the output voltage of one transformer is stepped down by a plurality of step-down converters to generate multiple DC voltages. However, in such configurations, the configuration may be complicated, and it may be difficult to reduce the size and cost.

In view of the above, an object of the present disclosure is to provide a power supply circuit that can supply multiple DC voltages with a simple configuration.

Solution to the Problems

A power supply circuit according to the present disclosure is provided with: an AC voltage supply part; and one or more Cockcroft-Walton circuits including a plurality of output terminals and supplied with an AC voltage from the AC voltage supply part. The plurality of output terminals are configured to output different DC potentials for each output terminal according to the magnitude of the AC voltage.

An input/output module according to the present disclosure is provided with the above-described power supply circuit.

Advantageous Effects

The present disclosure provides a power supply circuit that can supply multiple DC voltages with a simple configuration.

Embodiments will now be described in detail with reference to the accompanying drawings. It is intended, however, that unless particularly specified, dimensions, materials, shapes, relative positions and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

(Configuration of Power Supply Circuit)

Figure 1:
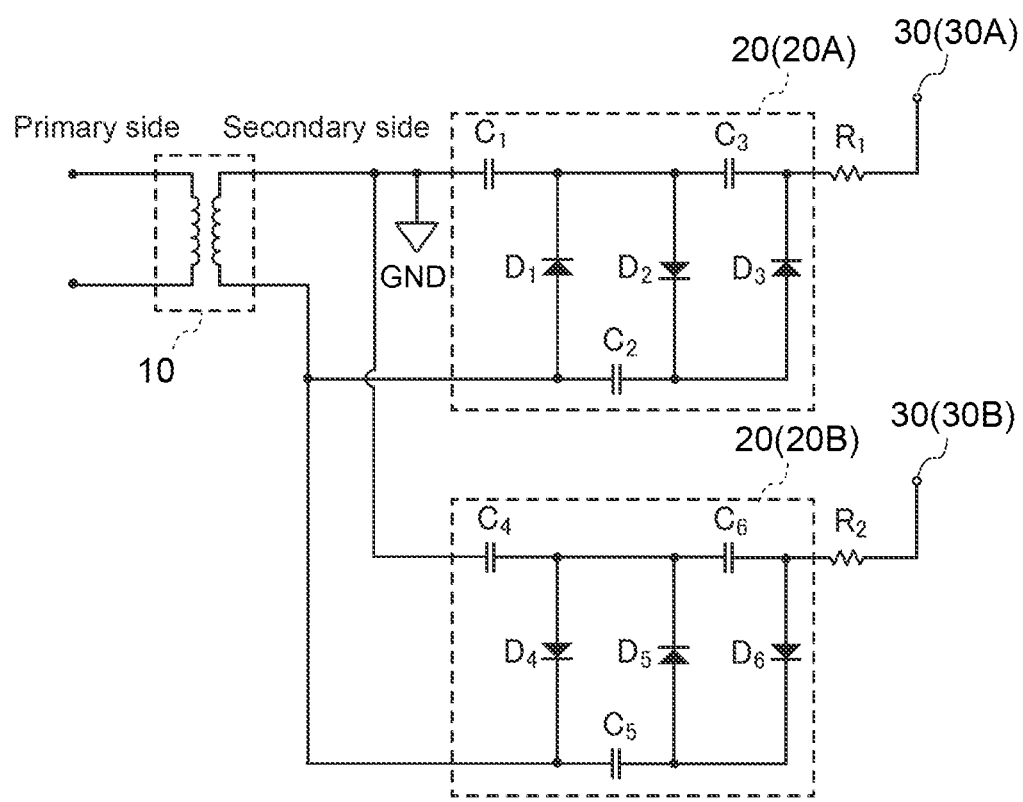
FIG. 1 is a configuration diagram of a power supply circuit according to an embodiment.
Figure 2:
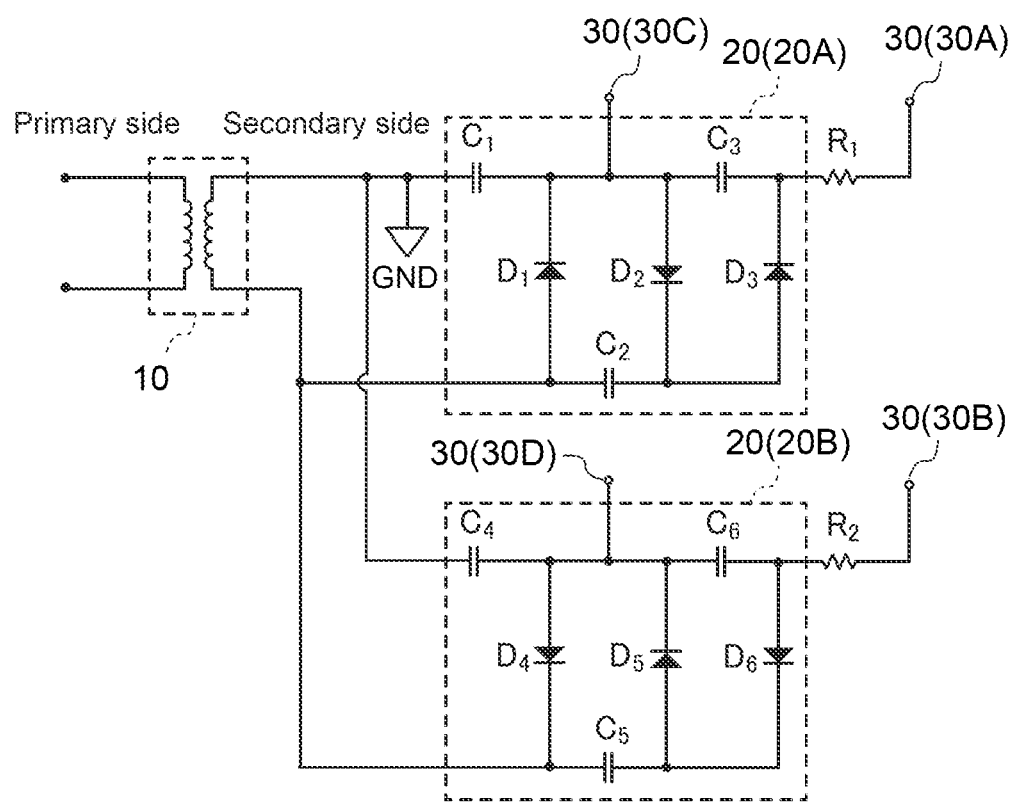
FIG. 2 is a configuration diagram of a power supply circuit according to an embodiment.

A configuration of a power supply circuit 100 according to an embodiment of the present disclosure will be described with reference to FIGS. 1 and 2. The power supply circuit 100 is a circuit for supplying multiple DC voltages. FIG. 1 is a configuration diagram of the power supply circuit 100 (100A) according to an embodiment. FIG. 2 is a configuration diagram of the power supply circuit 100 (100B) according to an embodiment.

For example, as shown in FIGS. 1 and 2, the power supply circuit 100 is provided with an AC voltage supply part 10 and one or more Cockcroft-Walton circuits 20. The one or more Cockcroft-Walton circuits 20 include a plurality of output terminals 30 and are supplied with an AC voltage from the AC voltage supply part 10.

In some embodiments, for example, as shown in FIGS. 1 to 2, the AC voltage supply part 10 is a transformer. To the primary side of the transformer, a voltage with an AC rectangular pulse waveform is applied. This pulse waveform voltage may be a voltage generated by (pulse width modulation (PWM) control. A voltage output from the secondary side of the transformer to the Cockcroft-Walton circuit 20 is an AC voltage with an AC rectangular pulse waveform.

The AC voltage supply part 10 is not limited to a transformer. For example, the AC voltage supply part 10 may be an AC power source which outputs a sinusoidal AC voltage, or may be a pulse source which outputs an AC voltage with a pulse waveform.

As shown in FIGS. 1 and 2, the output wires of the AC voltage supply part 10 (that is, the secondary wires of the transformer) are connected to two Cockcroft-Walton circuits 20 (20A, 20B). One of the output wires of the AC voltage supply part 10 (that is, the secondary wires of the transformer) is connected to a signal ground (GND). For example, as shown in FIGS. 1 and 2, the positive wire of the output wires of the AC voltage supply part 10 may be connected to the signal ground. The connection to the signal ground (GND) may be modified to a connection to the earth (that is, ground) or the frame ground (that is, housing).

In some embodiments, for example, as shown in FIGS. 1 and 2, the one or more Cockcroft-Walton circuits include a positive Cockcroft-Walton circuit 20 (20A) configured to output a positive potential, and a negative Cockcroft-Walton circuit 20 (20B) configured to output a negative potential, which are connected in parallel.

Specifically, two Cockcroft-Walton circuits 20 are connected in parallel to the secondary side of the transformer so as to rectify the secondary voltage of the transformer to different polarities. Each of the two Cockcroft-Walton circuits 20 is provided with one or more output terminals 30 including an output terminal 30 (30A, 30C) which outputs a positive DC potential and an output terminal 30 (30B, 30D) which outputs a positive DC potential. According to this configuration, since both positive and negative potentials are output, it is advantageous when positive and negative DC voltages are needed. For example, when such a power supply circuit 100 is applied to an input/output module 200 described later, it can be used as a power supply for supplying constant positive and negative DC voltages.

The Cockcroft-Walton circuit 20 (20A) includes three capacitors $C_1$, $C_2$, $C_3$ and three diodes $D_1$, $D_2$, $D_3$. The Cockcroft-Walton circuit 20 (20B) includes three capacitors $C_4$, $C_5$, $C_6$ and three diodes $D_4$, $D_5$, $D_6$.

The positive wire of the output wires of the AC voltage supply part 10 is connected to one end of the capacitor $C_1$ of the Cockcroft-Walton circuit 20 (20A). The other end of the capacitor $C_1$ is connected to the cathode terminal of the diode $D_1$ and the anode terminal of the diode $D_2$. Further, the anode terminal of the diode $D_2$ is connected to one end of the capacitor $C_3$.

The anode terminal of the diode $D_1$ is connected to one end of the capacitor $C_2$ and the negative wire of the output wires of the AC voltage supply part 10. The cathode terminal of the diode $D_2$ is connected to the other end of the capacitor $C_2$ and the anode terminal of the diode $D_3$. The other end of the capacitor $C_3$ is connected to the cathode terminal of the diode $D_3$ and one end of a resistor $R_1$. The other end of the resistor $R_1$ is connected to the output terminal 30 (30A).

Further, the positive wire of the output wires of the AC voltage supply part 10 is connected to one end of the capacitor $C_4$ of the Cockcroft-Walton circuit 20 (20B). The other end of the capacitor $C_4$ is connected to the anode terminal of the diode $D_4$ and the cathode terminal of the diode $D_5$. The cathode terminal of the diode $D_5$ is connected to one end of the capacitor $C_6$.

The cathode terminal of the diode $D_4$ is connected to one end of the capacitor $C_5$ and the negative wire of the output wires of the AC voltage supply part 10. The anode terminal of the diode $D_5$ is connected to the other end of the capacitor $C_5$ and the cathode terminal of the diode $D_6$. The other end of the capacitor $C_6$ is connected to the anode terminal of the diode $D_6$ and one end of a resistor $R_2$. The other end of the resistor $R_2$ is connected to the output terminal 30 (30B).

The plurality of output terminals 30 (30A, 30B, 30C, 30D) output different DC potentials according to the magnitude of the AC voltage supplied from the AC voltage supply part 10. For example, in FIGS. 1 and 2, the output terminal 30 (30A) may output a DC potential of 13.5V, and the output terminal 30 (30B) may output a DC potential of −13.5V.

According to this configuration, the output terminals 30 output different DC potentials. Thus, it is possible to supply multiple DC voltages by potential differences between each output terminal 30 and the GND reference potential. Further, since the Cockcroft-Walton circuit 20 can be formed by elements such as a diode (e.g., diodes $D_1$, $D_2$, $D_3$, $D_4$, $D_5$, $D_6$) and a capacitor (e.g., capacitors $C_1$, $C_2$, $C_3$, $C_4$, $C_5$, $C_6$), the power supply circuit 100 can be simply configured.

Further, in one Cockcroft-Walton circuit 20, the output terminals 30 may be arranged at different potential positions. For example, in FIG. 2, the Cockcroft-Walton circuit 20 (20A) is configured to charge the capacitor $C_1$ with a DC voltage obtained by rectifying the input voltage with the diode $D_1$, charge the capacitor $C_2$ with a superimposed voltage of a DC voltage obtained by rectifying the input voltage with the diode $D_2$ and the charging voltage of the capacitor $C_1$ and output a first DC potential through the output terminal 30 (30C), and charge the capacitor $C_3$ with a superimposed voltage of a DC voltage obtained by rectifying the input voltage with the diode $D_3$ and the charging voltage of the capacitor $C_2$ and output a second DC potential through the output terminal 30 (30C).

For example, the output terminal 30 (30A) of the Cockcroft-Walton circuit 20 (20A) may output a DC potential of 13.5V, and the output terminal 30 (30C) may output a DC potential of 4.5V. The Cockcroft-Walton circuit 20 (20B) outputs a DC potential having the opposite polarity to that of the Cockcroft-Walton circuit 20 (20A) by the same principle as described above. For example, the output terminal 30 (30B) of the Cockcroft-Walton circuit 20 (20B) may output a DC potential of −13.5V, and the output terminal 30 (30D) may output a DC potential of −4.5V.

According to this configuration, the output terminals 30 of one Cockcroft-Walton circuit 20 output different DC potentials. Thus, it is possible to supply multiple DC voltages by potential differences between each output terminal 30 and the GND reference potential.

In some embodiments, each of the output terminals 30 arranged at different positions outputs a DC potential (i.e., DC voltage) having a magnitude corresponding to an even or odd multiple of the magnitude of the AC voltage supplied from the AC voltage supply part 10. The "magnitude corresponding to an even or odd multiple of the magnitude of the AC voltage" means a magnitude obtained by multiplying the maximum (peak value) of the AC voltage minus the forward voltage drop Vf of one or more diodes (diodes $D_1$, $D_2$, $D_3$, $D_4$, $D_5$, $D_6$) by an even or odd number.

For example, in FIG. 2, the output terminal 30 (30C, 30D) outputs a DC potential (i.e., DC voltage) having a magnitude equivalent to the magnitude (peak value) of the AC voltage supplied from the AC voltage supply part 10, and the output terminal 30 (30A, 30B) outputs a DC potential (i.e., DC voltage) having a magnitude three times as large as that. FIG. 2 shows a configuration which outputs a DC potential that is an odd multiple (3 times) of the magnitude of the AC voltage supplied from the AC voltage supply part 10.

The power supply circuit 100 may be configured to output a DC potential that is an even multiple of the magnitude of the AC voltage supplied from the AC voltage supply part 10. In the configuration of even multiple, the negative wire of the output wires of the AC voltage supply part 10 is connected to the signal ground. Further, in the configuration of even multiple, there are an even number of pairs of diodes and capacitors that constitutes one Cockcroft-Walton circuit 20, so that the location of the output terminal 30 is different from that in the configuration of odd multiple.

For example, when there are five pairs of diodes and capacitors that constitutes one Cockcroft-Walton circuit 20, it is possible to output one or more DC potentials having a magnitude one, three, or five times as large as the magnitude of the AC voltage supplied from the AC voltage supply part 10. When there are six pairs of diodes and capacitors that constitutes one Cockcroft-Walton circuit 20, it is possible to output one or more DC potentials having a magnitude two, four, or six times as large as the magnitude of the AC voltage supplied from the AC voltage supply part 10.

The multiple DC voltages required for a circuit are usually often multiple voltages of even or odd multiples. In this regard, the above-described configuration of the power supply circuit 100 is advantageous in that it satisfies such a requirement.

(Configuration of Input/Output Module)

Hereinafter, an input/output module 300 according to a comparative example and an input/output module 200 according to an embodiment will be described. The input/output module 200, 300 is a circuit for inputting or outputting signals. For example, the input/output module 200, 300 may be an analog input module (AI modules) to which analog instrument signals are input, or a digital output module (DO modules) configured to output contact signals.

Figure 3:
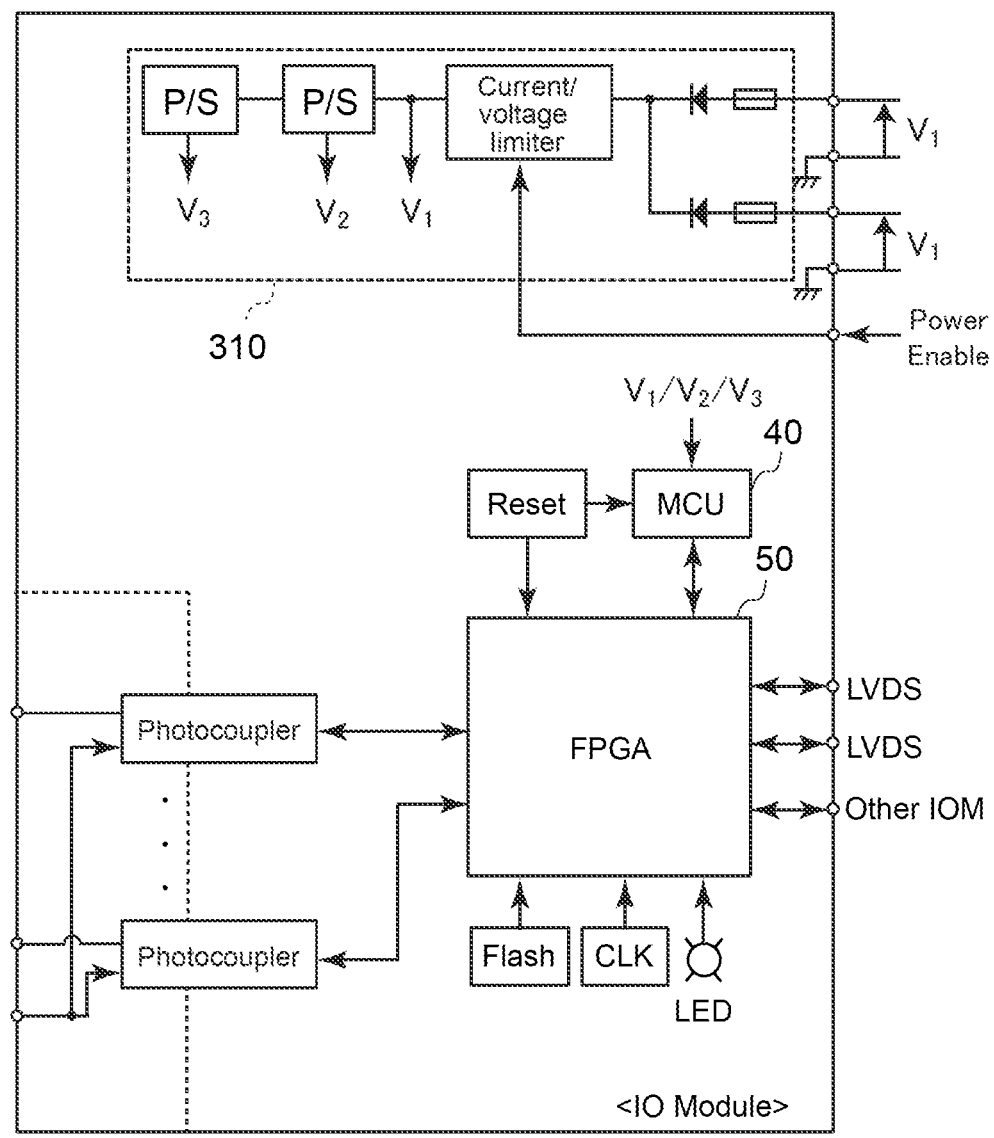
FIG. 3 is a schematic configuration block diagram of an input/output module according to a comparative example.
Figure 4:
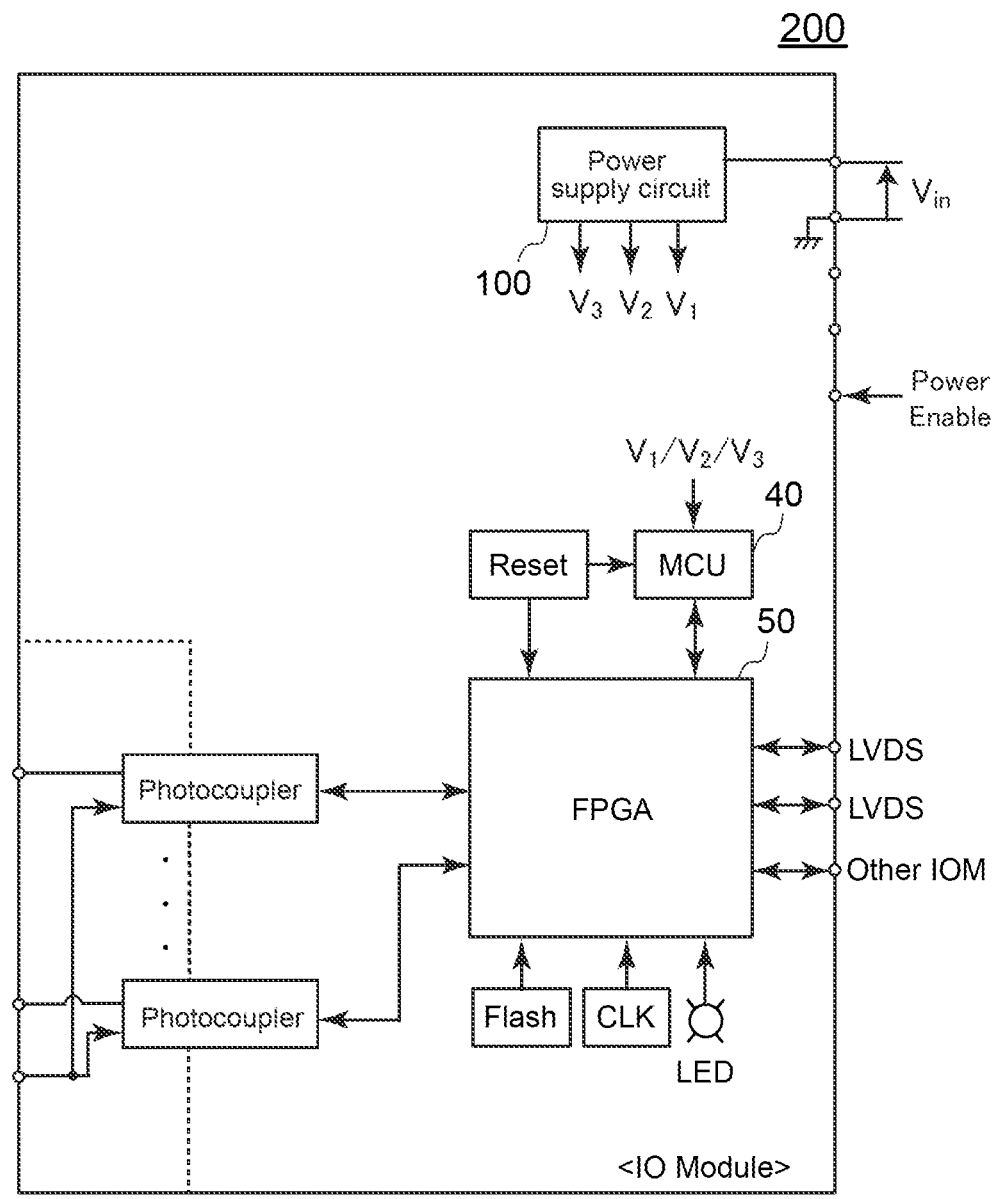
FIG. 4 is a schematic configuration block diagram of an input/output module according to an embodiment.

FIG. 3 is a schematic configuration block diagram of the input/output module 300 according to a comparative example. FIG. 4 is a schematic configuration block diagram of the input/output module 200 according to an embodiment. As shown in FIGS. 3 and 4, the input/output module 200, 300 is provided with a control circuit including an FPGA 50 (FPGA: Field-Programmable Gate Array), an MCU 40 (MCU: Micro-Control Unit), a clock circuit, and a reset circuit.

In the input/output module 200, 300, the MCU 40 is connected to terminals having multiple (e.g., three) DC potentials of a power supply circuit 100, 310, which will be described later. Thus, the MCU 40 is supplied with multiple DC voltages from the power supply circuit 100, 310. The power supply circuit 100, 310 may be connected to the FPGA 50 to supply DC voltages.

The input/output module 300 according to the comparative example is provided with the power supply circuit 310, as shown in FIG. 3. The power supply circuit 310 includes an input terminal to which a DC voltage $V_1$ is applied from an external source, a fuse and a diode, a current/voltage limiter for limiting the current and voltage to a predetermined level, a power supply part configured to generate a DC voltage $V_2$ from the DC voltage $V_1$ to supply power, and a power supply part configured to generate a DC voltage $V_3$ from the DC voltage $V_2$ to supply power. The power supply circuit 310 is configured to supply three DC voltages $V_1$, $V_2$, and $V_3$ to the MCU 40.

The input/output module 300 according to the comparative example is provided with the power supply circuit 310, as shown in FIG. 3. The power supply circuit 310 includes a fuse and a diode to which a DC voltage $V_1$ is applied from an external source, a current/voltage limiter for limiting the current and voltage to a predetermined level, a power supply part (P/S) configured to generate a DC voltage $V_2$ from the DC voltage $V_1$ to supply power, and a power supply part (P/S) configured to generate a DC voltage $V_3$ from the DC voltage $V_2$ to supply power. With this configuration, the power supply circuit 310 supplies three DC voltages $V_1$, $V_2$, and $V_3$ to the MCU 40. The power supply part (P/S) includes a transformer.

The input/output module 200 according to an embodiment is provided with the power supply circuit 100 to which a voltage $V_{in}$ is applied from an external source, as shown in FIG. 4. The power supply circuit 100 is composed of a diode and a capacitor, for example, as shown in FIGS. 1 and 2. When the AC voltage supply part 10 of the power supply circuit 100 is a transformer, the voltage $V_{in}$ applied to the power supply circuit 100 may be an AC voltage input to the primary side of the transformer.

The input/output module 300 according to the comparative example has a complicated configuration due to the power supply circuit 310 which includes two power supply parts (P/S), that is, two transformers. In contrast, in the input/output module 200 according to an embodiment, the power supply circuit 100 configured to supply multiple DC voltages is realized with a simple configuration. Therefore, it is possible to reduce the size and cost of the input/output module 200.

The present disclosure is not limited to the embodiments described above, but includes modifications to the embodiments described above, and embodiments composed of combinations of those embodiments.

CONCLUSION

The contents described in the above embodiments would be understood as follows, for instance.

(1) A power supply circuit (100) according to an embodiment of the present disclosure is provided with: an AC voltage supply part (10); and one or more Cockcroft-Walton circuits (20) including a plurality of output terminals (30) and supplied with an AC voltage from the AC voltage supply part (10). The plurality of output terminals (30) are configured to output different DC potentials for each output terminal (30) according to the magnitude of the AC voltage.

According to the configuration described in (1), the output terminals (30) output different DC potentials. Thus, it is possible to supply multiple DC voltages by potential differences between each output terminal (30) and the GND reference potential. Further, since the Cockcroft-Walton circuit (20) can be formed by elements such as a diode and a capacitor, the power supply circuit (100) can be simply configured.

(2) In some embodiments, in the above configuration (1), in one Cockcroft-Walton circuit (20), the output terminals (30) are arranged at different potential positions.

According to the configuration described in (2), the output terminals (30) of one Cockcroft-Walton circuit (20) output different DC potentials. Thus, it is possible to supply multiple DC voltages by potential differences between each output terminal (30) and the GND reference potential.

(3) In some embodiments, in the above configuration (2), each of the output terminals (30) arranged at different positions outputs a DC potential having a magnitude corresponding to an even or odd multiple of the magnitude of the AC voltage.

The multiple DC voltages required for a circuit are usually often multiple voltages of even or odd multiples. In this regard, the configuration described in (3) is advantageous in that it satisfies such a requirement.

(4) In some embodiments, in any one of the above configurations (1) to (3), the one or more Cockcroft-Walton circuits (20) include: a positive Cockcroft-Walton circuit (20A) configured to output a positive potential; and a negative Cockcroft-Walton circuit (20B) configured to output a negative potential, which are connected in parallel.

According to the configuration described in (4), since both positive and negative potentials are output, it is advantageous when positive and negative DC voltages are needed.

(5) An input/output module (200) according to an embodiment of the present disclosure is provided with the power supply circuit (100) described in any one of (1) to (4).

According to the configuration described in (5), the power supply circuit (100) configured to supply multiple DC voltages can be realized with a simple configuration, and the size and cost of the input/output module (200) can be reduced.

REFERENCE SIGNS LIST

10 AC voltage supply part
20 Cockcroft-Walton circuit
30 Output terminal
40 MCU
50 FPGA
100, 310 Power supply circuit
200, 300 Input/output module
$C_1, C_2, C_3, C_4, C_5, C_6$ Capacitor
$D_1, D_2, D_3, D_4, D_5, D_6$ Diode
$R_1, R_2$ Resistor

The invention claimed is:

1. A power supply circuit, comprising:
a single AC voltage supply part including output wires consisting of a first output wire and a second output wire, the single AC voltage supply part being configured to alternately apply positive AC voltage to the first output wire and the second output wire; and
one or more Cockcroft-Walton circuits supplied with an AC voltage from the output wires of the single AC voltage supply part,
wherein the one or more Cockcroft-Walton circuits include:
a positive Cockcroft-Walton circuit including one or more positive output terminals configured to output a positive potential; and
a negative Cockcroft-Walton circuit including one or more negative output terminals configured to output a negative potential,
wherein the positive Cockcroft-Walton circuit and the negative Cockcroft-Walton circuit are connected in parallel,
wherein the positive output terminals and the negative output terminals are configured to output different DC potentials for each output terminal according to a magnitude of the AC voltage.

2. The power supply circuit according to claim 1,
wherein, in the positive Cockcroft-Walton circuit, the positive output terminals are arranged at different potential positions, and
wherein, in the negative Cockcroft-Walton circuit, the negative output terminals are arranged at different potential positions.

3. The power supply circuit according to claim 2,
wherein each of the positive output terminals arranged at different positions configured to output a DC potential having a magnitude corresponding to an even or odd multiple of the magnitude of the AC voltage, and
wherein each of the negative output terminals arranged at different positions configured to output a DC potential having a magnitude corresponding to an even or odd multiple of the magnitude of the AC voltage.

4. An input/output module, comprising
the power supply circuit according to claim 1.

* * * * *